United States Patent [19]

Hayakawa et al.

[11] Patent Number: 4,512,906
[45] Date of Patent: Apr. 23, 1985

[54] WET PROCESS FOR PREPARING FERRITES OF MAGNETOPLUMBITE STRUCTURE IN FINE PARTICLE FORM

[75] Inventors: Masanori Hayakawa; Satoshi Nishimura, both of Ube, Japan

[73] Assignee: Central Glass Company Limited, Ube, Japan

[21] Appl. No.: 647,879

[22] Filed: Sep. 6, 1984

Related U.S. Application Data

[63] Continuation of Ser. No. 434,512, Oct. 15, 1982, abandoned.

[30] Foreign Application Priority Data

Oct. 16, 1981 [JP] Japan ................... 56-164091

[51] Int. Cl.$^3$ ............................................. C04B 35/26
[52] U.S. Cl. .................................... 252/62.63; 423/594
[58] Field of Search ...................... 252/62.63; 423/594

[56] References Cited

U.S. PATENT DOCUMENTS

| | | | |
|---|---|---|---|
| 3,723,587 | 3/1973 | Iwase et al. | 252/62.63 X |
| 3,855,374 | 12/1974 | Brailowsky | 252/62.63 X |
| 3,895,092 | 7/1975 | Sironi et al. | 423/594 X |
| 4,279,763 | 7/1981 | Boeuf et al. | 252/62.63 X |

FOREIGN PATENT DOCUMENTS 46-3545  4/1971  Japan .
47-25796 7/1972  Japan .

OTHER PUBLICATIONS

"Structural and Magnetic Studies of Hydrothermally Synthesized New Ferrites"; Professor S. Okamoto; Research Bulletin of Nagaoka Institute of Science and Technology; No. 4 (1982).

*Primary Examiner*—Jack Cooper
*Attorney, Agent, or Firm*—Fleit, Jacobson, Cohn & Price

[57] ABSTRACT

Fine particles of a ferrite having the magnetoplumbite structure are prepared by hydrothermal treatment of $\gamma\text{-Fe}_2\text{O}_3$ and at least one compound of a divalent metal selected from Ba, Sr and Pb in an aqueous alkali solution, preferably at 80°–360° C. This process is suitable for preparation of hexagonal and thin plate-shaped particles of the ferrite and is advantageous in consuming only a small quantity of alkali. Alternative to $\gamma\text{-Fe}_2\text{O}_3$, it is possible to use either $\text{Fe}_3\text{O}_4$ or an intermediate iron oxide expressed by $(\text{FeO})_x\cdot\text{Fe}_2\text{O}_3$, where $0 < x < 1$, as the starting iron oxide with the addition of an oxidizer to the hydrothermal reaction system to cause oxidation of the starting iron oxide to $\gamma\text{-Fe}_2\text{O}_3$ during an initial stage of the hydrothermal treatment.

7 Claims, 2 Drawing Figures

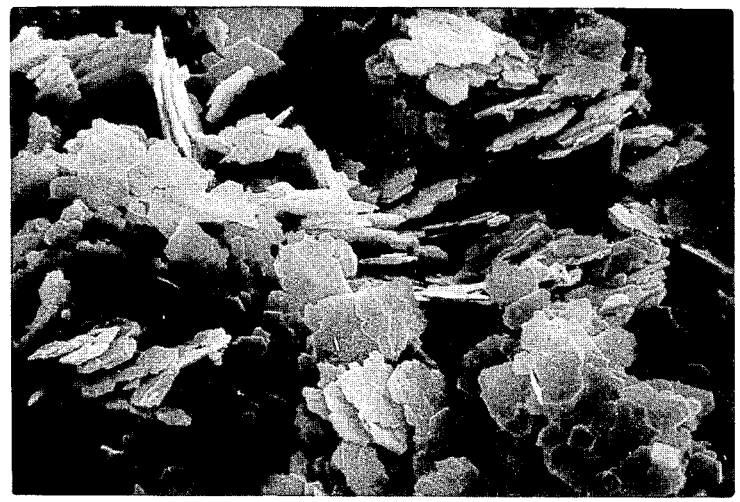
FIG. 1  ⊢——⊣ 2μ
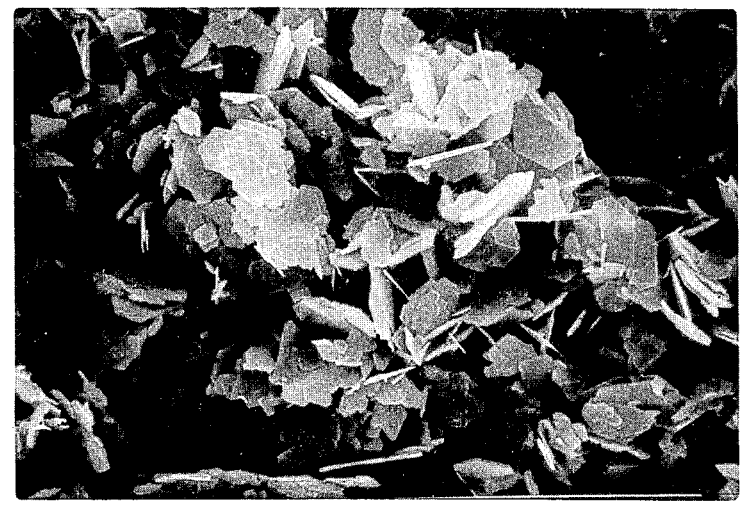
FIG. 2  ⊢——⊣ 2μ

WET PROCESS FOR PREPARING FERRITES OF MAGNETOPLUMBITE STRUCTURE IN FINE PARTICLE FORM

This application is a continuation, of application Ser. No. 434,512, filed Oct. 15, 1982 now abandoned.

BACKGROUND OF THE INVENTION

This invention relates to a wet process for preparing fine, plate-shaped particles of a ferrite having the magnetoplumbite structure.

Recently, in the field of composite magnetic materials, such as plastic magnets in sheet form, for example, there has been an increasing demand for fine and plate-shaped particles of ferrites. Also in the field of magnetic recording media, preference is often given to plate-shaped ferrite particles over needle-shaped particles as the development of new recording methods continues and the areas of application of the recording media expand.

Ferrites having the magnetoplumbite structure are known as suitable for such uses. Typical ferrite compounds of this class are Ba-ferrite, Sr-ferrite and Pb-ferrite, and it is also known that these ferrite compounds form useful solid solution with one another. General requirements for the plate-shaped ferrite particles for the aforementioned uses include the following items: (1) to be completely ferritized; (2) to be narrow in particle size distribution so as to easily and uniformly be dispersed in liquid or plastic materials; (3) to have a truly plate-like particle shape with very small thickness-to-width ratio; (4) to be so small in particle size that each ferrite particle in smaller than or nearly equivalent to a single magnetic domain; and (5) to be free of mechanical distortion.

Both dry processes and wet processes are known for the preparation of fine particles of ferrites having the magnetoplumbite structure, but in our view a wet process is more suitable than a dry process for preparing particulate ferrites of this class with success in realzing favorable properties including the above listed items.

As to the wet processes for the preparation of particulate ferrites of the magnetoplumbite structure, the most popular example will be the hydrothermal synthesis of Ba-ferrite described in Japanese Patent Specification Publication Nos. 46(1971)-3545 and 47(1972)-25796. In this process, either a salt of trivalent iron or goethite $\alpha$-FeO.OH and a barium salt are employed as the principal materials, and, with the addition of a strong alkali as a neutralizing agent, these materials are subjected to hydrothermal treatment in an autoclave to obtain a Ba-ferrite in the form of the fine particles dispersed in an alkaline solution. Thus, it is characteristic of these processes to use either a salt of trivalent iron or an iron oxyhydroxide as the source of iron in Ba-ferrite.

From an industrial point of view, however, these conventional wet processes are disadvantageous in that they consume large quantitites of alkali, which is a relatively expensive material, in that they produce relatively large amounts of unwanted salts as a by-product and in that they need to carry out elaborate washing of the product thereby consuming of large quantities of water.

SUMMARY OF THE INVENTION

It is an object of the present invention to provide a novel wet process for preparing fine particles of a ferrite having the magnetoplumbite structure, which process gives the ferrite particles desirable physical properties, and enables great reduction in the consumption of alkali compared with the above described conventional wet processes, and enhances the operational efficiency in the industrial preparation of the ferrite particles.

According to the invention, fine particles of a ferrite having the magnetoplumbite structure are prepared by subjecting $\gamma$-$Fe_2O_3$ and at least one compound of a divalent metal selected from Ba, Sr and Pb to hydrothermal treatment in an aqueous alkali solution.

Preferably the hydrothermal treatment is carried out at temperatures in the range of from 80° to 360° C., and most preferably in the range of from 180° to 260° C.

In the present invention, it is possible to use either magnetite $Fe_3O_4$ or an intermediate oxide between magnetite and hematite $Fe_2O_3$, expressed by the formula $(FeO)_x \cdot Fe_2O_3$, where $0 < x < 1$, in place of using $\gamma$-$Fe_2O_3$ as the starting material. In the case of using either magnetite or such an intermediate iron oxide as starting material, a process according to the invention is started by subjecting magnetite or the intermediate iron oxide and the aforementioned barium, strontium and/or lead compound(s) to hydrothermal treatment in an aqueous alkali solution in the presence of an oxidizer. During this hydrothermal treatment, $Fe_3O_4$ or $(FeO)_x \cdot Fe_2O_3$ dispersed in the aqueous solution is first oxidized to $\gamma$-$Fe_2O_3$ by the action of the oxidizer present in the reaction system. This oxidation will proceed in the manner of diffusion of oxygen in the solid iron oxide, so that $\gamma$-$Fe_2O_3$ given by the oxidation will be initially in a particulate form almost unchanged from the particulate form of the starting iron oxide. This thermal treatment is further continued in order to cause the formed $\gamma$-$Fe_2O_3$ to react with Ba, Sr and/or Pb, which is present in the form of an hydroxide(s) dissolved in the alkali solution. During this hydrothermal reaction stage the $\gamma$-$Fe_2O_3$ particles dissolve in the alkali solution, and then precipitation of fine particles of a ferrite containing Ba, Sr and/or Pb occurs from the solution.

The process according to the invention is advantageous over the conventional wet processes especially regarding the following points:

(1) The consumption of alkali in the process is greatly reduced, because in this process, alkali is consumed only in neutralizing the barium, strontium and/or lead compound(s).

(2) The total amount of salt by-products becomes considerably smaller, because the origin of salt by-products is limited to the neutralization of the divalent metal compound(s) and the decomposition of the oxidizer used to form $\gamma$-$Fe_2O_3$ by oxidation of a lower oxide of iron.

(3) The washing of the product can be completed with enhanced efficiency and with a considerable reduction in the quantity of washing water.

(4) The ferrite-particles are obtained in a desirably thin plate-like particle shape, and it is possible to decrease the thickness-to-width ratio of the ferrite particles. Besides, it is easy to control the particle size of the ferrite particles by controlling the particle size of the iron oxide employed as the starting material.

BRIEF DESCRIPTION OF THE DRAWING

FIG. 1 is an electron micrograph of hexagonal plate-shaped particles of a Ba-ferrite obtained by a process embodying the present invention; and FIG. 2 is an electron micrograph of hexagonal plate-shaped particles of a Ba—Sr-ferrite obtained by a process also embodying the invention.

DESCRIPTION OF THE PREFERRED EMBODIMENTS

In the present invention, the iron oxide as the principal starting material, is selected from $\gamma$-$Fe_2O_3$, $Fe_3O_4$ and intermediate oxides expressed by the general formula $(FeO)_x \cdot Fe_2O_3$, where $0 < x < 1$. (If x is 1.0, this general formula represents magnetite $Fe_3O_4$.) This is an important feature of the invention. Insofar as this requirement can be met, both naturally-occurring iron oxides and synthetic iron oxides are useful in this invention. In every case, the starting iron oxide should be in a finely divided form, but there is no particular restriction as to the particle shape of the starting iron oxide, so that either needle-shaped particles or generally globular particles may be used. From the viewpoint of reactivity, it is desirable to use iron oxide particles high in purity and small in particle size.

As the secondary material, use is made of a barium compound, a strontium compound or a lead compound, or a mixture thereof, according to the composition of the intended ferrite having the magnetoplumbite structure. The selection of the secondary material among inorganic barium, strontium and lead compounds is made primarily considering the solubility in water at the temperatures employed in the hydrothermal treatment according to the invention. Usually it is suitable to make a selection among chlorides, nitrates and hydroxides, and it is unsuitable to use a low solubility salt such as carbonate or sulfate.

As to the proportion of the barium, strontium and/or lead compound(s) to the iron oxide as the principal starting material, it is preferred that the mole ratio of $Fe_2O_3$, given by the principal starting material, to the total of BaO, SrO and PbO, given by the secondary material, falls in the range of from 4 to 6, and most preferably, in the range of from 5 to 6.

As the alkali in this process, it is usual to use an alkali metal hydroxide such as sodium hydroxide or potassium hydroxide. Preferably, the alkali concentration of the aqueous alkali solution is adjusted such that the concentration of free alkali after neutralization of the divalent metal compound(s) is in the range of from 0.01 to 10N, and more preferably, in the range of from 0.05 to 5N, when use is made of sodium hydroxide, which is the most practical.

The ferrite-forming hydrothermal treatment according to the present invention is carried out preferably at temperatures in the range of from 80° to 360° C., and most preferably, in the range of from 180° to 260° C. When $Fe_3O_4$ or $(FeO)_x \cdot Fe_2O_3$ ($0 < x < 1$) is employed as the starting iron oxide, the initial hydrothermal treatment for oxidation of the starting iron oxide can be carried out at substantially the same temperatures.

As to the oxidizer needed when $Fe_3O_4$ or $(FeO)_x \cdot Fe_2O_3$ ($0 < x < 1$) is employed as the starting iron oxide, virtually a free choice can be made among popular inorganic oxidizers, such as chlorates, perchlorates, nitrates, hydrogen peroxide and oxygen gas. When a nitrate of barium, strontium or lead is employed as the aforementioned secondary material, it is possible to use this nitrate also as the oxidizer without the addition of a different oxidizer.

The method of the present invention will be illustrated by the following examples, but needless to say, the scope of the invention is not limited to these examples.

EXAMPLE 1

In this example, 25 g of $Fe_3O_4$ of reagent grade, 7.7 g of $Ba(NO_3)_2$, 6.5 g of NaOH and 200 g of water were charged into an autoclave equipped with a stirrer. The reaction system in the autoclave was heated and maintained at 240° C. for 5 hr. After that, the reaction system was left to natural cooling, and the solid component of the reacted mixture was separated from the alkali solution by filtration, was washed with water and was dried. Obtained, as the result, was 29 g of fine crystals having a brownish color. By X-ray diffraction analysis and electron microscope observation, the crystalline product was confirmed to be hexagonal plate-shaped crystals of Ba-ferrite, $BaO \cdot 5.7Fe_2O_3$ having, the magnetoplumbite structure. The Ba-ferrite crystals had a mean particle size of 1.5 $\mu$m. FIG. 1 is an electron micrograph of the Ba-ferrite obtained in this example.

EXAMPLE 2

To prepare $Fe_3O_4$ for use in a process according to the invention, 300 g of a $\alpha$-$Fe_2O_3$, sold as an industrial material for ferrites, 31.8 g of iron powder and 1200 g of 48% aqueous solution of NaOH were charged into an autoclave equipped with a stirrer. After replacement of air in the autoclave by nitrogen gas, the reaction system was heated and maintained at 170° C. for 3 hr. This process gave 320 g of $Fe_3O_4$.

Next, 200 g of $Fe_3O_4$ prepared by the above process, 57.6 g of $BaCl_2$, 23.2 g of $NaClO_3$, 190 g of 48% aqueous solution of NaOH and 810 g of water were charged into an autoclave equipped with a stirrer were subjected to hydrothermal reaction at 240° C. for 5 hr, and then were left to natural cooling. The solid component of the reacted mixture was separated from the alkali solution by filtration, was washed with water and was dried to obtain 225 g of fine, brownish crystals, which were confirmed to be hexagonal plate-shaped crystals of Ba-ferrite, $BaO \cdot 5.7Fe_2O_3$, having the magnetoplumbite structure. The Ba-ferrite crystals had a mean particle size of 1.7 $\mu$m.

EXAMPLE 3

In an electric furnace, $Fe_3O_4$ of reagent grade was heated at 220° C. for 2 hr to undergo air oxidation, and, as the result, was turned into a higher oxide expressed by $(FeO)_{0.63}Fe_2O_3$.

Next, 25 g of the thus obtained iron oxide, 7.8 g of $Ba(NO_3)_2$, 6.5 g of NaOH and 200 g of water were charged into an autoclave equipped with a stirrer and were subjected to hydrothermal reaction at 240° C. for 5 hr. The solid product of this reaction weighed 29 g in the dry state and was confirmed to be hexagonal plate-shaped crystals of Ba-ferrite, $BaO \cdot 5.7Fe_2O_3$, having the magnetoplumbite structure. The Ba-ferrite crystals had a mean particle size of 1.8 $\mu$m.

EXAMPLE 4

In an electric furnace, $Fe_3O_4$ of reagent grade was heated at 220° C. for 15 hr to undergo air oxidation, and, as the result, was completely turned into $\gamma$-$Fe_2O_3$.

Next, 25 g of this $\gamma$-Fe$_2$O$_3$, 7.0 g of BaCl$_2$, 16 g of NaOH and 200 g of water were charged into an autoclave equipped with a stirrer and were subjected to hydrothermal reaction at 230° C. for 5 hr. The solid product of this reaction weighed 28 g in the dry state and was confirmed to be hexagonal plate-shaped crystals of Ba-ferrite, BaO.5.7Fe$_2$O$_3$, having the magnetoplumbite structure. The Ba-ferrite crystals had a mean particle size of 1.7 $\mu$m.

EXAMPLE 5

In this example, 25 g of Fe$_3$O$_4$ of reagent grade, 5.4 g of Ba(NO$_3$)$_2$, 1.9 g of Sr(NO$_3$)$_2$, 17 g of NaOH and 200 g of water were charged into an autoclave equipped with a stirrer and were subjected to hydrothermal reaction at 250° C. for 5 hr. By X-ray diffraction analysis, chemical analysis and electron microscope observation, the solid product of this reaction was confirmed to be hexagonal plate-shaped crystals of a ferrite having the magnetoplumbite structure expressed by (Ba$_{0.7}$Sr$_{0.3}$)O.5.6Fe$_2$O$_3$. The ferrite crystals had a means particle size of 1.9 $\mu$m. FIG. 2 is an electron micrograph of the ferrite obtained in this example.

EXAMPLE 6

In this example, 25 g of Fe$_3$O$_4$ of reagent grade, 6.2 g of Ba(NO$_3$)$_2$, 2.0 g of Pb(NO$_3$)$_2$, 17 g of NaOH and 200 g of water were charged into an autoclave equipped with a stirrer and were subjected to hydrothermal reaction at 250° C. for 5 hr. The solid product of this reaction was confirmed to be hexagonal plate-shaped crystals of a ferrite having the magnetoplumbite structure expressed by (Ba$_{0.8}$Pb$_{0.2}$)O.5.7Fe$_2$O$_3$. The ferrite crystals had a mean particle size of 2.0 $\mu$m.

What is claimed is:

1. A process for preparing fine particles of a ferrite having the magnetoplumbite structure, the process comprising:
   subjecting to hydrothermal treatment in an aqueous alkali solution $\gamma$-Fe$_2$O$_3$ and at least one compound of a divalent metal selected from the group consisting of Ba, Sr and Pb, wherein said at least one compound of divalent metal is a salt selected from the group consisting of chlorides, nitrates and hydroxides, wherein the proportion of said $\gamma$-Fe$_2$O$_3$ to said at least one compound of divalent metal is such that the mole ratio of Fe$_2$O$_3$ to the total of BaO, SrO and PbO given by said at least one compound in the hydrothermal treatment, is in the range of from 4:1 to 6:1, and wherein said hydrothermal treatment is performed at temperatures in the range of from about 180° C. to about 260° C.

2. A process according to claim 1, wherein the hydrothermal treatment step comprises a sub-step of treating an iron oxide expressed by the formula (FeO)$_x$.Fe$_2$O$_3$, where $0 < x \leq 1$, and said at least one compound of divalent metal in an aqueous alkali solution in the presence of an oxidizer such that said iron oxide is oxidized to $\gamma$-Fe$_2$O$_3$, said sub-step being performed as an initial stage of said hydrothermal treatment step.

3. A process according to claim 2, wherein said hydrothermal treatment in said sub-step is performed at temperatures in the range from about 180° C. to about 260° C.

4. A process according to claim 2, wherein said oxidizer is selected from the group consisting of chlorates, perchlorates, nitrates, hydrogen peroxide and oxygen gas.

5. A process according to claim 2, wherein said at least one compound of divalent metal comprises a nitrate, said nitrate being used also as said oxidizer.

6. A process according to claim 1, wherein said mole ratio is in the range from 5:1 to 6:1.

7. A process according to claim 1, wherein said aqueous alkali solution is a solution of an alkali metal hydroxide.

* * * * *